United States Patent
Bjekovic et al.

(10) Patent No.: US 7,147,738 B2
(45) Date of Patent: Dec. 12, 2006

(54) COMPONENT WITH AN INNER FABRIC AND PROCESS FOR PRODUCING SAME

(75) Inventors: Robert Bjekovic, Ehingen (DE); Konrad Eipper, Rottenburg (DE); Bruno Möltgen, Tiefenbronn (DE); Jörn Roth, Bad Rothenfelde (DE); Markus Vennemann, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 984 days.

(21) Appl. No.: 09/828,480

(22) Filed: Apr. 9, 2001

(65) Prior Publication Data

US 2002/0016121 A1 Feb. 7, 2002

(30) Foreign Application Priority Data

Apr. 7, 2000 (DE) ................. 100 17 493

(51) Int. Cl.
*B32B 37/04* (2006.01)
(52) U.S. Cl. .............. 156/228; 156/242; 264/299
(58) Field of Classification Search ............ 264/299; 156/228, 242
See application file for complete search history.

(56) References Cited

U.S. PATENT DOCUMENTS 5,670,235 A * 9/1997 Stricker et al. ............ 428/138

FOREIGN PATENT DOCUMENTS

| DE | 34 10 503.4 | | 3/1984 |
|---|---|---|---|
| DE | 35 42 217.3 | | 11/1985 |
| DE | 39 31 452.9 | | 9/1989 |
| DE | 4030815 | A1 | 4/1992 |
| EP | 0418772 | * | 3/1991 |
| EP | 0 531 473 | | 3/1992 |

* cited by examiner

*Primary Examiner*—Elizabeth M. Cole
(74) *Attorney, Agent, or Firm*—Crowell & Moring LLP

(57) ABSTRACT

A process for producing a component with an inner fabric includes layering at least two layers of fabric one on top of the other. A layer of plastic in powder form or sheet form is introduced between respective pairs of neighboring layers of fabric. The plastic has a melting point corresponding to at most the melting point and/or the decomposing temperature of the fabric layers. The fabric layers and plastic layer are heated and pressed at a pressure greater than atmospheric pressure, during which the plastic layer is at least partially melted. After reaching the desired final form, the partially-melted plastic is cooled, thereby bonding the fabric layers to one another. The cooled plastic is arranged between the layers of fabric and, in particular, at least partially between the fibers of the fabric layers.

16 Claims, 4 Drawing Sheets

COMPONENT WITH AN INNER FABRIC AND PROCESS FOR PRODUCING SAME

BACKGROUND AND SUMMARY OF INVENTION

This application claims the priority of German application No. 100 17 493.0, filed Apr. 7, 2000, the disclosure of which is expressly incorporated by reference herein.

The present invention relates to a component with an inner fabric and to process for producing the component.

EP 531 473 B1 discloses a process for producing a component in which a plurality of layers of a polymer fabric are laid one on top of the other and subsequently are partially melted under a pressure above atmospheric pressure. As a result, the fibers of the fabric bond, so that a monolithic component is formed from the layers of fabric in the manner of a sintered body. The component can be used in particular (1) as the final form of a molding, for example, a panelling part such as a boot lid, an engine bonnet, and the like, and/or (2) as a semifinished product for the subsequent production of a molding. However, a component of this type tears relatively easily in the region of the individual layers of fabric and is relatively expensive to produce. In order that the respective fibers are melted only at their surface, the temperature control for this process is very complex and consequently expensive. This applies in particular when there are many layers of fabric, as with components having a large layer thickness, since the fibers in the center must of course absorb sufficient heat.

The object of the present invention is to provide a process and a component produced by it that has a greater stability and possibly can be produced at lower cost.

Other objects, advantages and novel features of the present invention will become apparent from the following detailed description of the invention when considered in conjunction with the accompanying drawings.

DETAILED DESCRIPTION OF THE DRAWINGS

Figure 1:
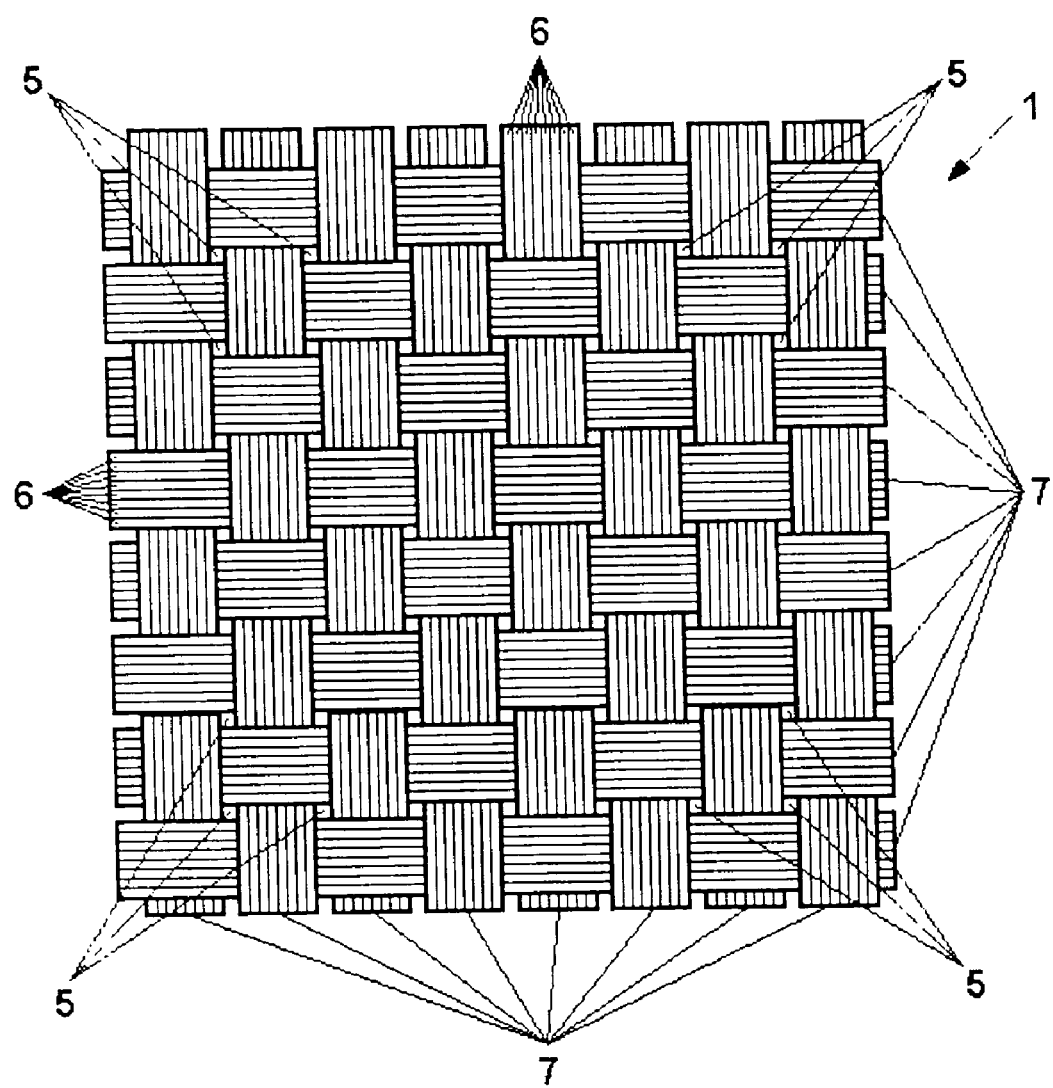
FIG. 1 shows a fabric formed from a plurality of filaments woven with one another.

FIG. 1 shows a single layer of fabric 1, the filaments 7 of which are formed in the manner of a yarn of individual intertwined fibers 6. The individual filaments 7 have a flat or oval cross section (i.e. the quotient of the width and the height of a filament 7 is greater than 2 and, in particular, greater than 10), whereby the layer of fabric 1 is less like a netting and more like a mat. In the region of crossing points of two filaments 7, the layer of fabric 1 has clearances 5. Between the individual fibers 6 of the filaments and between neighbouring filaments 7 there are usually likewise clearances 5, although generally of a smaller size.

Figure 2:
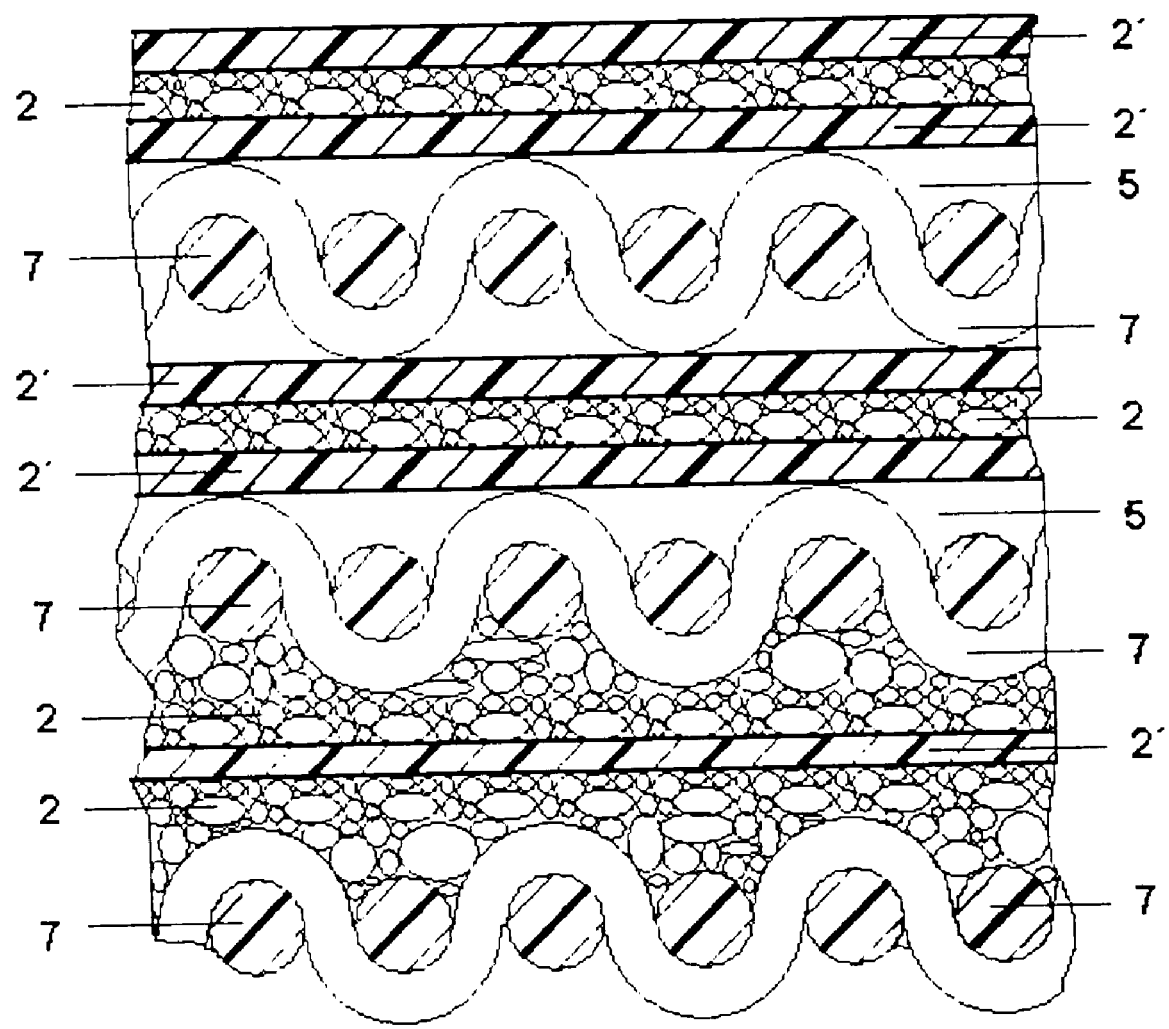
FIG. 2 shows a schematic structure of a plurality of layers of fabric and plastic in sheet and powder form.

FIG. 2 shows a structure such as that intended for the subsequent production of a component 4 according to the present invention. For forming the structure, a plurality of layers of fabric 1 are laid one on top of the other. In this exemplary embodiment, the filaments 7 of the layer of fabric 1 have a round cross section, whereby the overall volume of all the clearances 5 is increased. This is of advantage in particular whenever the volume content of the subsequent component 4 made up by the plastic of the layers of plastic 2, 2' is to be relatively great.

A layer of plastic 2, 2' is respectively arranged between neighbouring layers of fabric 1. It is possible for the layer of plastic to be a powder 2; particles; and/or a sheet 2'. The melting point of the plastic of the layers of plastic 2, 2' is expediently below the melting point or the decomposing temperature of the layer of fabric 1. As a result, the plastic of the layers 2, 2' melts before any thermally induced impairment of the layers of fabric 1, as a result of which the fibers 6 of the fabric are not at risk. The lower or negligible risk to which the fibers 6 are exposed has the overall effect that the entire procedure is simplified and therefore less costly. At the same time, there is lower waste.

A sheet 2' is expedient as the layer of plastic, since it can be easily introduced. One of the advantages of a powder 2 for the layer of plastic is that, even in the solid state, it penetrates better into the clearances 5 of a single layer of fabric 1 and is therefore also able to fill the clearances 5 between two neighbouring layers of fabric 1.

Figure 4:
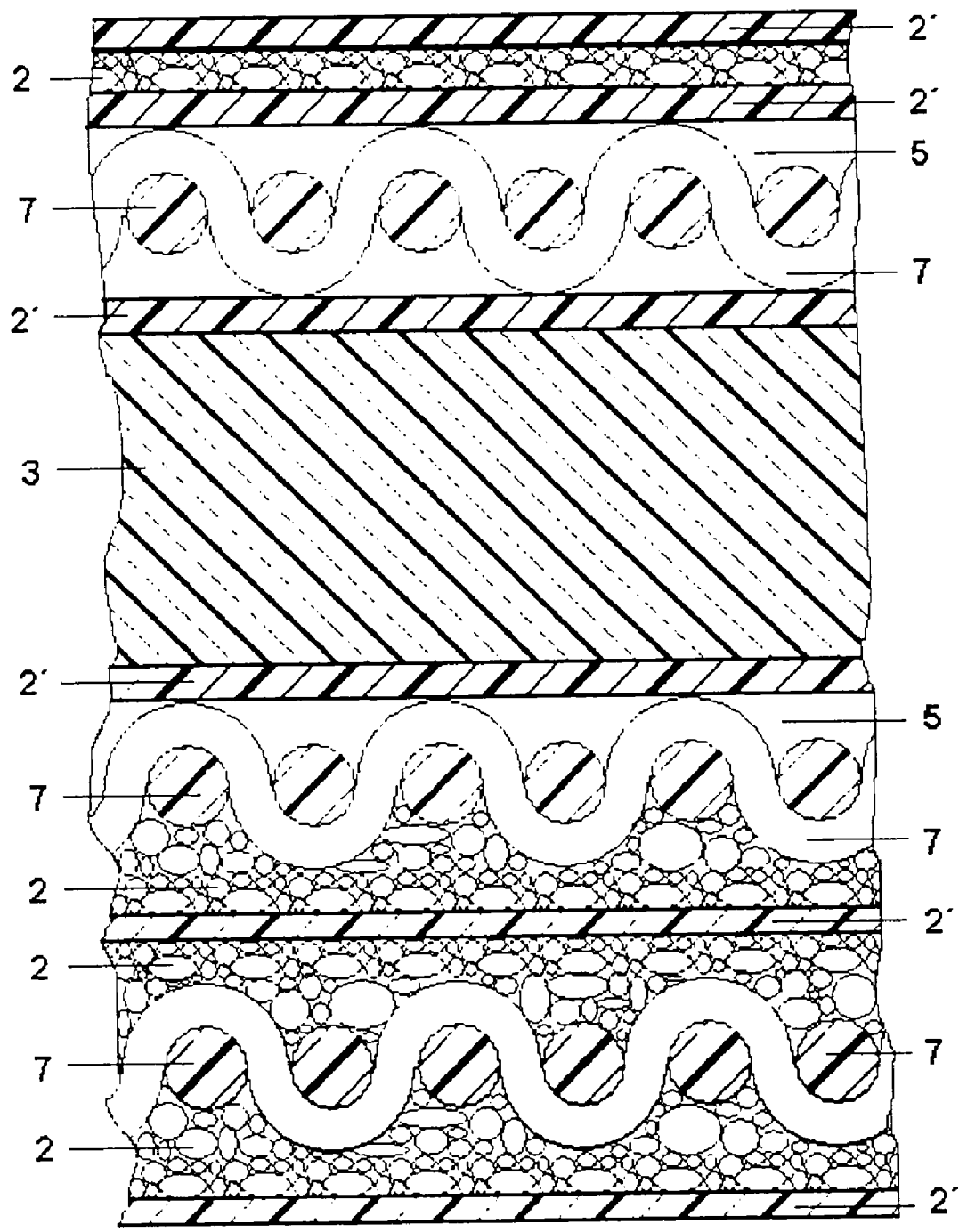
FIG. 4 shows a schematic structure of a plurality of layers of fabric and plastic in sheet and powder form and also with a layer of foam.

As mentioned, a layer of plastic 2, 2' may be exclusively a powder 2 or a sheet 2', but may also, for example, be an alternating arrangement of a sheet 2' and powder 2, as shown in FIGS. 2 and 4. Furthermore, there is also the possibility of the sheet 2' having on one or both of its surfaces a further layer, the melting point of which is preferably lower. In particular, two alternatives are represented in FIG. 2.

In the first alternative, a sheet 2' is first arranged indirectly on a layer of fabric 1. Between the two sheets 2' of the layer of plastic, a powder 2 of plastic is additionally introduced.

In the second alternative, the powder 2 of the layer of plastic is firstly arranged indirectly on a layer of fabric 1. Between the powder fills, the sheet 2' of this layer of plastic is introduced. As already mentioned, in this case the filling of the clearances 5 in the fabric and between the neighbouring layers of fabric 1 is improved.

One of the effects of this measure is that during the subsequent melting the shrinkage of the structure for the subsequent component 4 is less.

In both cases (powder 2 or sheet 2' directly on the layer of fabric 1), it is expedient that the plastic of the powder 2 has a different melting point than the plastic of the sheet 2'.

The powder 2 expediently melts more readily, whereby the plastic of the powder 2 of the layer of plastic can penetrate first into the clearances 5 of the fibers 6 or of the filaments 7 and into the clearances 5 of the layers of fabric 1. This process is further assisted by the parts of the layer of plastic on the sheet side.

As a result, the layers of fabric 1 can be wetted extensively, virtually completely, with the plastic of the layers of plastic 2, 2'. The plastic of the layers of plastic 2, 2' then forms a kind of polymer matrix for the layers of fabric 1 and incorporates them within it, at least to a great extent.

In some cases, it is favourable to use a plastic as the material for the layers of fabric 1. This is advantageous in particular if the individual fibers 6 or filaments 7 of the layers of fabric 1 are superficially partly melted to a small degree, while maintaining the fabric structure. This makes it possible for the layers of fabric 1 also to be bonded monolithically with the plastic of the molten layers of plastic 2, 2'. A maximum volume-related melting of the fibers 6 of approximately 10% has been found to be a favourable value.

Figure 3:
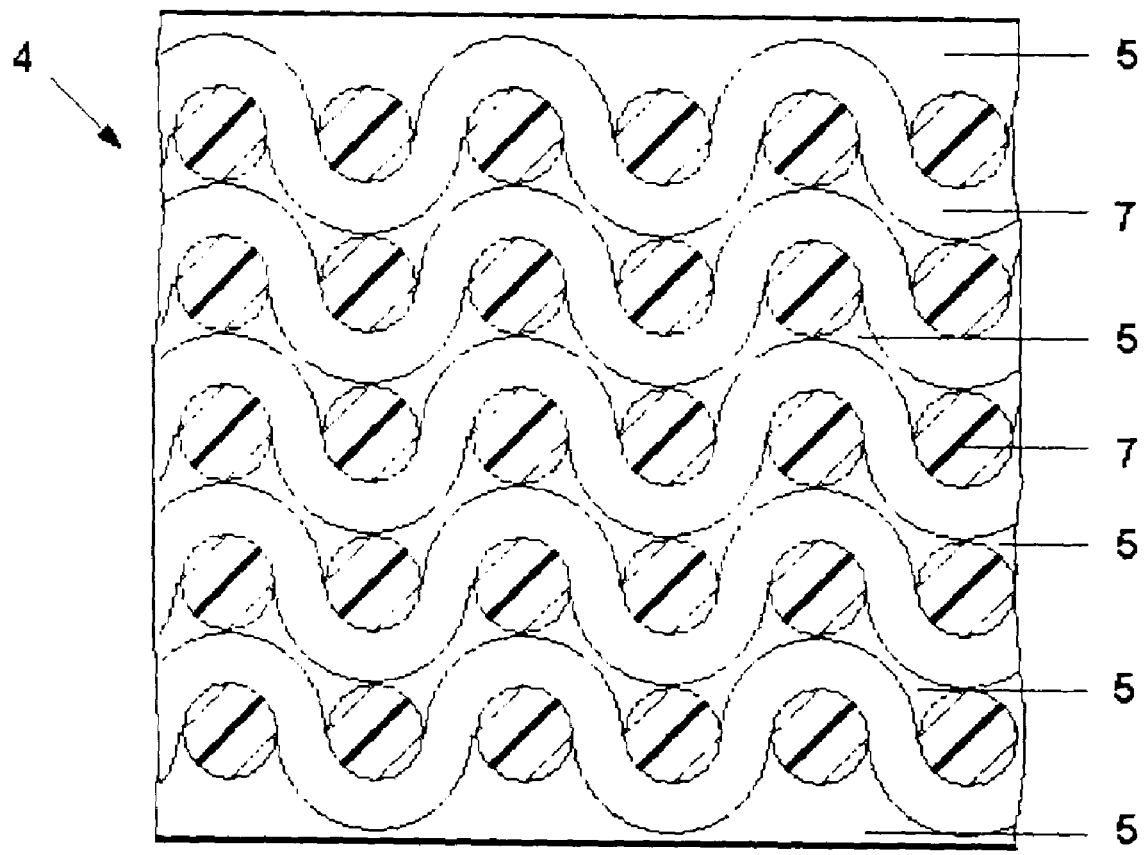
FIG. 3 shows a finished component in cross section.

In FIG. 3, a detail of a section through a finished component 4 is represented. Component 4 is preferably formed such that it is close to its final form, in particular dimensionally accurate, with regard to its subsequent use.

In the case of component 4, the individual layers of fabric 1 are arranged within a polymer matrix. The polymer matrix is formed from the plastic of the previous layers of plastic 2, 2'. The earlier clearances 5 between neighbouring layers of fabric 1 and the individual layers of fabric 1 themselves are likewise filled, preferably completely, by the plastic of the previous layers of plastic 2, 2'.

In particular, the fabric structure of the filaments 7 of the layers of fabric is intact. At most, the individual filaments 7 have been melted slightly at their surface. Advantageously, in these regions the filaments 7 are bonded monolithically with the plastic of the previous layers of plastic 2, 2'.

In FIG. 4, a structure for producing a component of lightweight design is represented. The structure has in extensive parts the lamination of the individual layers of fabric 1 and layers of plastic 2, 2' as represented in FIG. 2.

As a difference from the structure according to FIG. 3, the structure according to FIG. 4 additionally has a centrally arranged layer of foam 3. Arranged alongside the layer of foam 3 on both sides there is respectively a layer of plastic.

In order that the layer of foam 3 is not inordinately loaded during the production of the component 4, in particular in order that it is not destroyed, the melting temperature of the layer of foam 3 expediently corresponds at least to the melting temperature of the plastic of the layer of plastic 2, 2'.

In a particular way, the foam of the layer of foam 3 is superficially melted locally in the region of the melted layers of plastic 2, 2'. This makes it possible to bond the layer of foam 3 monolithically with the polymer matrix of the subsequent component. This monolithic bonding improves the stability and the internal cohesion of the subsequent component 4.

An improvement in the stability and cohesion can be realized or enhanced by arranging in the surface of the layer of foam 3 undercuts or the like, which are at least partially filled by the molten plastic of the layers of plastic 2, 2', so that at this boundary surface the various layers are mechanically connected to one another by the denticulations.

For producing a component 4 according to the present invention, layers of fabric 1 and layers of plastic 2, 2' are arranged alternately one on top of the other, in particular in a way corresponding to the exemplary embodiments according to FIG. 2 or 4. In the exemplary embodiment according to FIG. 4, starting from a structure according to FIG. 2, a layer of foam 3 is additionally laid within the structure, preferably centrally within it.

The volume of a layer of plastic 2, 2' is preferably dimensioned such that it is greater than or equal (1) to the volume corresponding to the sum of the clearances 5 between neighbouring layers of fabric 1 in the desired final state of the subsequent component 4 plus (2) half the clearances 5 which each of the two neighbouring layers of fabric 1 has itself. This measure ensures at least extensive filling of the layers of fabric 1 with the plastic in the subsequent component 4.

The individual layers are subsequently pressed with one another, preferably with a pressure of between 5 and 400 bar, in particular between 10 and 200 bar, transversely in relation to their surface. Therefore, the individual layers are preferably arranged within a pressing mold and/or a pressing and shaping mold.

During the pressing, at least the plastic of the layers of plastic 2, 2' is heated to a temperature between 120° C. and 165° C. The heating takes place for example in a conventional manner by a resistance heating element arranged within the pressing mold and/or shaping mold. In addition, or alternatively, the heating of the plastic of the layers of plastic 2, 2' may also take place by applying a high-frequency electric field.

Since the melting or decomposing temperature of the fibers 6 of the layers of fiber 1 (in the exemplary embodiment according to FIG. 4 also of the foam of the layer of foam 3) is greater than the melting temperature of the plastic of the layers of plastic 2, 2', the plastic is liquefied and, assisted by the pressure applied, penetrates into the clearances 5 of the layers of fabric 1.

In this respect, it is favourable to maintain the pressure while the layers of fabric 1 are being infiltrated with the plastic, for which reason it has to be adjusted, owing to the volume shrinkage.

Altogether, the operation of building up the pressure and carrying out the heating takes place within 1 to 240 seconds, in particular between 2 and 120 seconds. In this time, all the materials involved are loaded thermally, and on the pressure side, at most to an acceptable extent.

After this time, the mold is relieved of pressure and at the same time cooled. Following cooling, the plastic of the previous layers of plastic 2, 2' forms a polymer matrix, which encloses the fibers 6 of the layers of fabric 1 at least extensively, preferably completely.

To improve the stability and the internal cohesion of the subsequent component 4, the different melting points and materials of the fabric; of the plastic of the layers of plastic 2, 2'; and possibly of the foam 3 are matched to one another in such a way that the fibers of the layers of fabric 1 and possibly of the foam of the layer of foam 3 melt superficially and bond expediently monolithically with the initially melted and subsequently solidified plastic of the layers of plastic 2, 2'. This is made possible in a simple way if layers of fabric 1 made of plastic are used.

If a layer of foam 3 is used, the stability or cohesion of the subsequent component 4 can be improved instead or in addition also by providing in the surface of the layer of foam 3 undercuts or the like, which are at least extensively filled by the molten plastic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a component with an inner fabric, comprising:

providing a plurality of fabric layers, one layer on top of another layer, wherein the plurality of fabric layers comprise a polymer fabric;

arranging a plastic layer between at least one pair of the plurality of fabric layers, wherein the plastic layer has a melting point of at most a melting point or a decomposing temperature of the plurality of fabric layers;

pressing the plurality of fabric layers and the plastic layer under a pressure greater than atmospheric pressure;

at least partially melting the plastic layer;

melting a maximum of approximately 10 vol. % of fibers of the plurality of fabric layers;

after reaching a desired final form, cooling the melted plastic;

monolithically bonding the plurality of fabric layers to one another by the cooled plastic and by the partially-melted fibers, wherein the layer of plastic is in at least one of a powder form or a sheet form.

2. A process according to claim 1, wherein the at least partially melted plastic layer infiltrates into the plurality of fabric layers.

3. A process according to claim 1, wherein, when at least partially melting the plastic layer, a pressure of between 5 and 400 bar is applied.

4. A process according to claim 3, wherein a pressure of between 10 and 200 bar is applied.

5. A process according to claim 1, wherein the plastic layer has a melting temperature of between 120° C. and 165° C.

6. A process according to claim 1, wherein the plurality of fabric layers and the at least partially-melted plastic layer are pressed with one another for between 1 and 240 seconds.

7. A process according to claim 6, wherein the plurality of fabric layers and the at least partially-melted plastic layer are pressed with one another for between 2 and 120 seconds.

8. A process according to claim 1, further comprising introducing a centrally-arranged foam layer in the plurality of fabric layers.

9. A process according to claim 8, wherein a plastic layer is arranged alongside the foam layer.

10. A process according to claim 8, wherein a plastic layer is arranged along both sides of the foam layer.

11. A process according to claim 9, wherein the foam layer comprises a material having a melting temperature of at least the melting temperature of the plastic layer.

12. A process according to claim 1, wherein the pressing is in a molding press.

13. A process according to claim 1, wherein the plastic layer has a melting point below at least one of the melting point or the decomposing temperature of the plurality of fabric layers.

14. A process according to claim 1, wherein the plastic layer has a volume greater than or equal to a sum of:
- clearances between neighboring fabric layers in a desired final state of the component, and
- half of the clearances which each of the two neighboring fabric layers has itself.

15. A process according to claim 1, wherein the fabric of the plurality of fabric layers comprises a filament made from fibers, wherein the filament has a width that is greater than its height by at least a factor of 2.

16. A process according to claim 15, wherein the filament has a width that is greater than its height by at least a factor of 10.

* * * * *